Aug. 11, 1959

W. E. BRADLEY 2,898,743

ELECTRONIC COOLING DEVICE AND METHOD
FOR THE FABRICATION THEREOF

Filed July 23, 1956

INVENTOR.
WILLIAM E. BRADLEY
BY

ATTORNEY

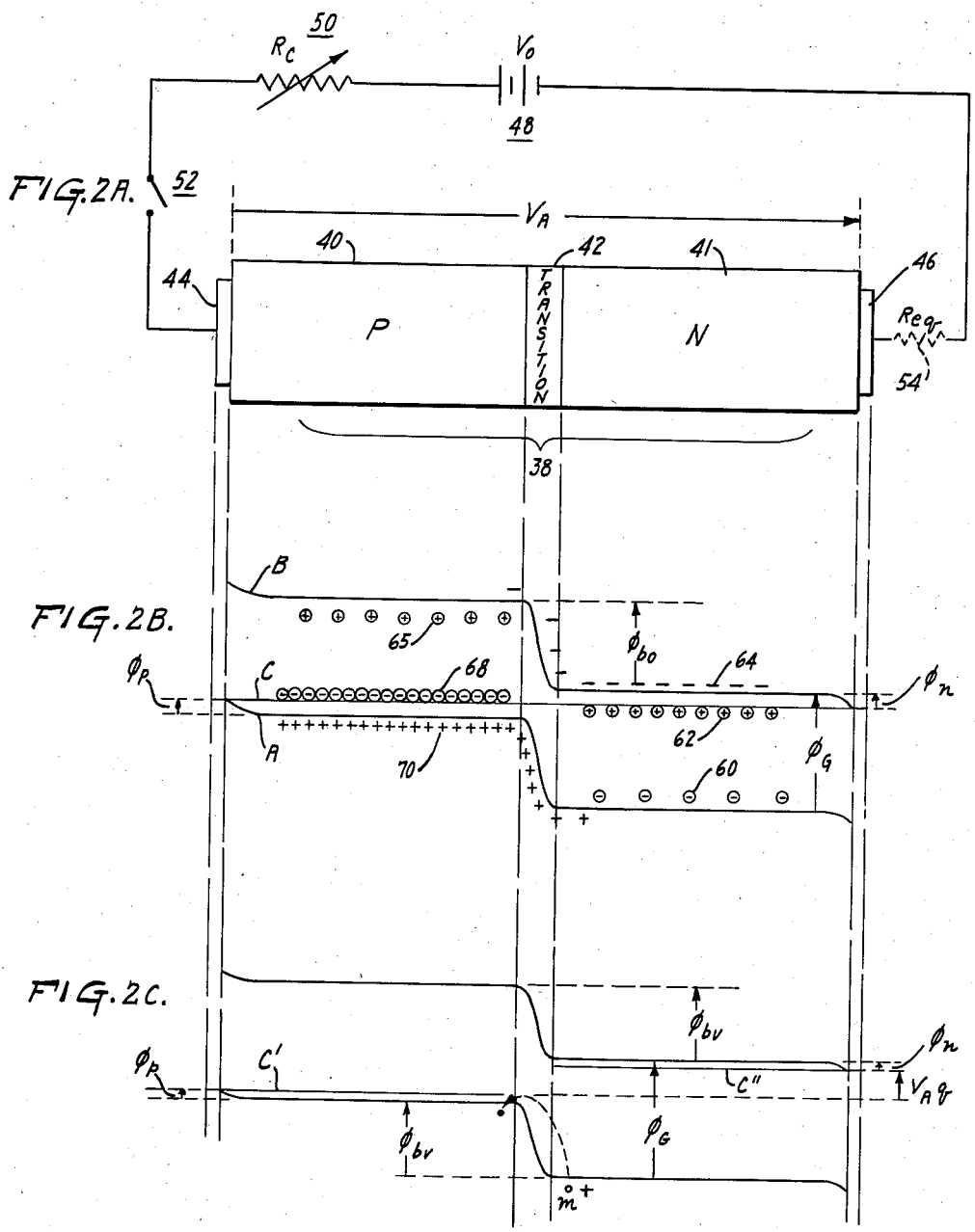

Aug. 11, 1959 W. E. BRADLEY 2,898,743
ELECTRONIC COOLING DEVICE AND METHOD
FOR THE FABRICATION THEREOF
Filed July 23, 1956 3 Sheets-Sheet 3
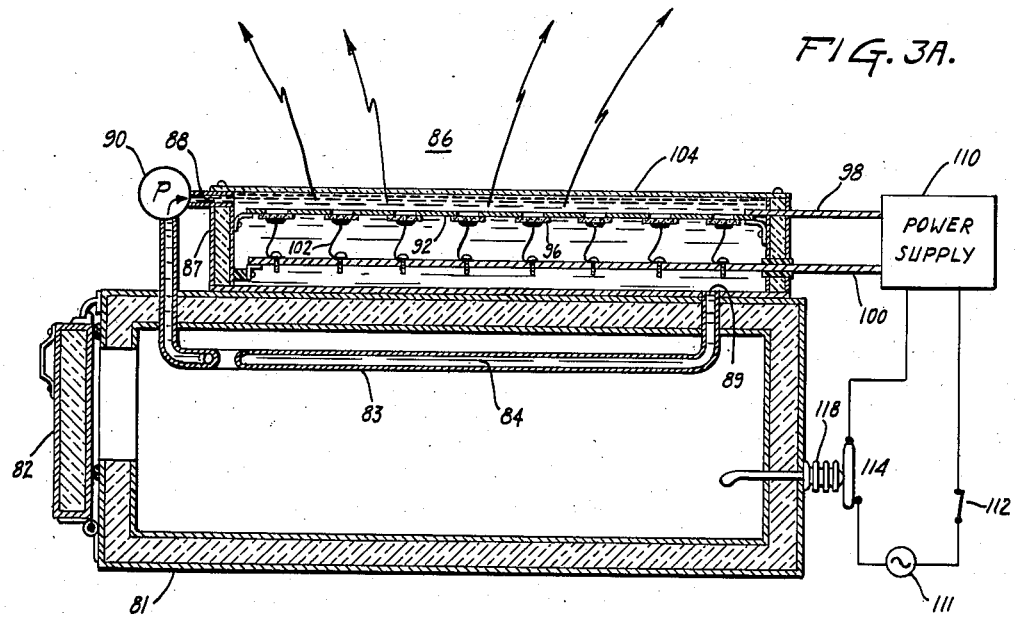
FIG. 3A.
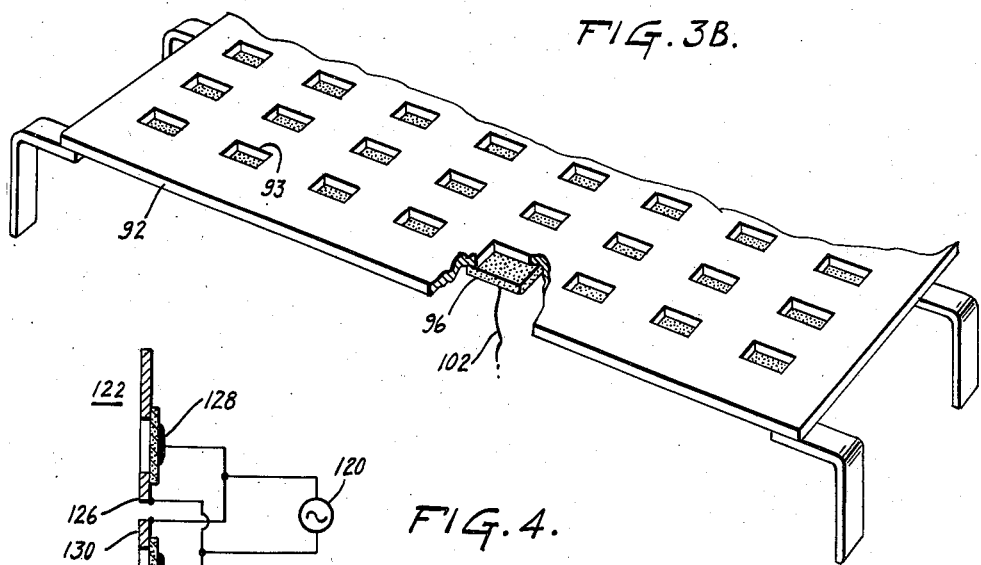
FIG. 3B.
FIG. 4.
INVENTOR.
WILLIAM E. BRADLEY
BY
ATTORNEY

ELECTRONIC COOLING DEVICE AND METHOD
FOR THE FABRICATION THEREOF

William E. Bradley, New Hope, Pa., assignor to Philco Corporation, Philadelphia, Pa., a corporation of Pennsylvania Application July 23, 1956, Serial No. 599,474

8 Claims. (Cl. 62—3)

The present invention relates to devices, materials and methods useful in accomplishing heat exchange and particularly electronic refrigeration.

Many methods of accomplishing refrigeration with varying degrees of efficiency and simplicity, and over various temperature ranges, are known in the art, and many have found commercial application. Outstanding among these has been the ordinary domestic refrigerator, making use of the controlled evaporation and condensation of suitable fluids to provide an absorption of heat within the region to be refrigerated, and a delivery and expulsion of the heat into another region insulated from the refrigerated region. Other refrigeration systems utilizing different principles of operation have also been developed and have found use in various applications.

Despite the commercial practicality of existing refrigeration systems, the desirability of reducing the complexity and the mechanical problems involved in standard refrigerator types has made highly attractive the possibility of accomplishing refrigeration by purely electronic means. To this end, efforts have been made in the past to obtain useful electronic refrigeration by means of Peltier cooling, for example; however, because of the small cooling effects, small temperature differentials and low efficiencies commonly obtained, as well as other practical difficulties, Peltier cooling has proved to be of little practical interest to this time.

Accordingly, it is an object of my invention to provide a new and improved device for accomplishing refrigeration.

Another object is to provide new and improved apparatus for accomplishing electronic cooling.

A further object is to provide new and improved refrigeration apparatus in which the basic cooling action requires no mechanical motion.

Another object is to provide a new electronic cooling device which is inherently capable of producing large cooling effects and large temperature differentials with high efficiency and without mechanical or electrical complexity.

Still another object is to provide such apparatus in which the cooling effect arises directly from the passage of an electrical current through it.

A further object is to provide such cooling apparatus which may be silent and substantially vibrationless in operation.

Another object is to provide such apparatus which may be operated directly from an alternating-current supply line.

It is another object to provide a semiconductive material responsive to the injection of minority-carriers to produce a marked cooling effect.

Another object is to provide an extremely compact cooling device suitable for liquefaction of gases, cooling of infrared detectors and the like.

Another object is to provide improved apparatus for disposing of heat by radiation where no cool atmosphere or heat conduction sink is available.

A further object is to provide a semiconductive material of unusually high radiative recombination rate.

Still another object is to provide a method for producing a material of the last-named type.

The above objectives are achieved, in accordance with the invention, by the provision of a device which comprises as one important element thereof a body of semiconductive material characterized by a high radiative recombination rate for holes and electrons therein; as utilized herein, the term radiative recombination rate designates that percentage of the recombinations occurring in a semiconductive material for which the hole-electron energy is converted primarily into electromagnetic radiations, rather than into thermal vibrations of the crystal lattice. I have found that when more than the equilibrium density of holes and electrons is produced in such a semiconductive body by a process involving absorption of thermal energy, and when provision is made for the dissipation of the radiative energy of hole-electron recombinations in a region thermally insulated from the body, a useful net cooling effect is obtained.

In a preferred embodiment of the invention, the non-equilibrium concentration of holes and electrons in the semi-conductive body is provided by establishing a potential barrier within the body and applying a difference of potential across the barrier in the direction of easier current flow, so that minority-carriers are introduced into the semiconductive body in substantial quantities in response to the applied current. As is described in detail hereinafter, injection of minority-carriers into the semiconductive body by the passage of current over the barrier provides, under the proper conditions, a conversion of thermal energy of the body into electron energy, and produces a basic cooling effect upon the material which, were it not for the provision of a high rate of radiative recombinations in the semiconductive material, would be substantially cancelled by the heat generated as the injected minority-carriers recombine with the majority-carriers. However since, in accordance with the invention, a large percentage of the recombinations are caused to be of the radiative type, and since the radiative energy produced by recombinations is caused to escape from the body and to be absorbed in a region insulated from the body, the cooling effect exerted by the flow of current predominates and produces a net cooling effect. While the passage of the current through the body also produces some degree of ohmic heating by ordinary Joule effect which tends to oppose the above-mentioned cooling effect, by avoiding excessively high currents and employing low resistivity materials such ohmic heating may be made sufficiently small that a substantial and useful amount of net cooling is obtained.

In one particularly simple form of the invention, the required potential barrier is provided by a P–N junction located in the semiconductive body adjacent a region of high radiative recombination rate, the P–N junction being forward-biased by an applied voltage so that minority-carriers are emitted into the semiconductive material of high radiative recombination rate. Preferably the form and configuration of the semiconductive body and of the junction are such that most of the recombinations occur near an exposed surface of the semiconductor, as may be accomplished by making the semiconductor in the form of a thin wafer and providing the junction within the wafer and substantially parallel to a broad surface thereof. However, other carrier injection means and other configurations of semiconductive body may also be employed.

In constructing certain commercial forms of the invention, large numbers of cooling elements of the basic type described above may be combined and operated in parallel to produce additive cooling effects, and appropriate thermal connection may be provided between the cooled portions of the semiconductor and the load which it is desired to refrigerate. The cooling elements may be operated from direct-current sources or from alternating-current sources, and, in one particularly convenient form of the device in which effective use of ordinary alternating line-current is made, half of the devices may be poled to conduct and to cool on one half-cycle of the current, and the remaining half on the opposite half-cycle.

Although the principal constituent of the semiconductive body of high radiative recombination rate may be of any of a number of different materials, such as silicon, germanium, cadmium selenide, indium antimonide, aluminum antimonide, cadmium telluride or others, it is important that the body be distinguished from conventional semiconductors in possessing an unusually high radiative recombination rate; for example, to obtain a useful cooling effect I have found that a radiative recombination rate of more than about 10% is highly desirable, and for best results this rate is 20% or more, as opposed to radiative recombination rates in pure germanium at room temperature of less than about 0.0001%.

I have found that, in one form, such material of high radiative recombination rate may be obtained by controlling the nature, concentrations and distributions of significant impurities contained within the semiconductive body so as to increase greatly the probability of direct hole-electron recombinations. Thus, in one preferred type of material, I employ a semiconductive body containing a high excess concentration of that class of impurity which produces carriers of a type opposite to the minority-carriers to be injected, so that large numbers of majority-carriers are available for recombination. In addition, I prefer to include relatively large numbers of impurity atoms of the class which tend to produce carriers of the same type as are to be injected, and to disperse this minority impurity also throughout the region of the crystal in which minority-carrier injection occurs, in such manner that holes and electrons tend to be localized or immobilized in adjacent positions, whereby the probability of direct hole-electron recombination is greatly enhanced.

In addition, I have found it advantageous that the acceptor and donor impurities be arranged in pairs through the material, and that the members of each pair be spaced from each other by less than about 10 interatomic distances but by more than 1 interatomic distance, i.e., they should not be nearest neighbors in the crystal. I have found that pairing of this type may be facilitated by choosing donor and acceptor impurities which are such as to produce stresses of similar sense upon the crystal structure of the semiconductor in which they are contained. Thus, I prefer to use donor and acceptor impurity atoms which are both larger than the atoms of the principal semiconductive material and hence both produce dilatations of the crystal lattice, or which are both smaller than the principal semiconductive material and therefore produce contractions of the crystal lattice in the vicinity thereof. With such impurities, the tendency of donor impurity atoms to approach each other in response to electrostatic attraction during typical crystal growing, alloying or annealing processes, is resisted strongly when the oppositely-charged donor and acceptor atoms approach positions of nearest neighbors. The result of these two opposing tendencies is to form pairs, each containing one donor atom and one acceptor atom closely-spaced from each other but not nearest neighbors, as has been found desirable to facilitate the desired type of direct, radiative hole-electron recombinations.

Accordingly, to provide a semiconductor material of unusually high recombination rate, the semiconductive body may be formed from a melt of semiconductive material containing relatively large concentrations of both donor and acceptor impurity types, the donor and acceptor impurities being of the same class with respect to the sense of distortion which they produce in the crystal-lattice structure after crystallization. A single-crystal grown from this melt then contains the desired impurity distribution, and will exhibit the desired high radiative recombination rate. By utilizing suitable relative amounts of the donor and acceptor impurities, an appropriately low resistivity may also be obtained.

Alternatively a material exhibiting the phenomenon of "edge emission" may be employed, in which case added impurity substances are not necessary for radiative recombination. Typical examples of this class of materials of high radiative recombination rate are indium antimonide and cadmium sulfide.

A suitable potential barrier may be provided in such semiconductive materials by any of a variety of known techniques, such as by altering the impurity concentrations during the latter portion of crystal growth to produce a grown junction, by alloying an appropriate type of impurity with the semiconductive body after crystallization, or, where the nature of the body permits, a surface-barrier electrode may be provided upon the surface of the material to form the desired barrier. After making appropriate connections to opposite sides of the potential barrier and providing appropriate thermal connections to the load to be cooled, refrigeration may be obtained by passage of current through the body in the direction of easy flow of charge carriers across the potential barrier. Because of the rectifying properties of such junctions, I have found that alternating voltages may also be applied to produce the desired injection.

Other objects and features of the invention will become apparent from a consideration of the following detailed description, taken in conjunction with the accompanying drawings, in which:

Figures 1A and 1B constitute, respectively, an enlarged, elevational view in section and a plan view of a simple embodiment of the invention from which a net cooling effect may be obtained;

Figures 2A, 2B and 2C are diagrammatic representations to which reference will be made in explaining the principle of the invention;

Figure 3A is an elevational view of apparatus in accordance with the invention from which there may be obtained greater amounts of useful cooling than from the simplified arrangement shown in Figure 1;

Figure 3B is an enlarged, fragmentary view, in perspective, of a portion of the apparatus of Figure 3A; and Figure 4 is a diagrammatic representation illustrating an arrangement for operating a plurality of units such as that shown in Figure 1, directly from an alternating-current source.

Figure 1A:
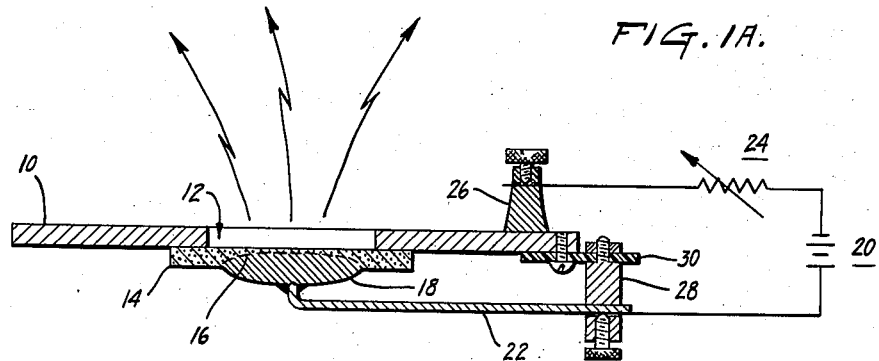
Figure 1B:
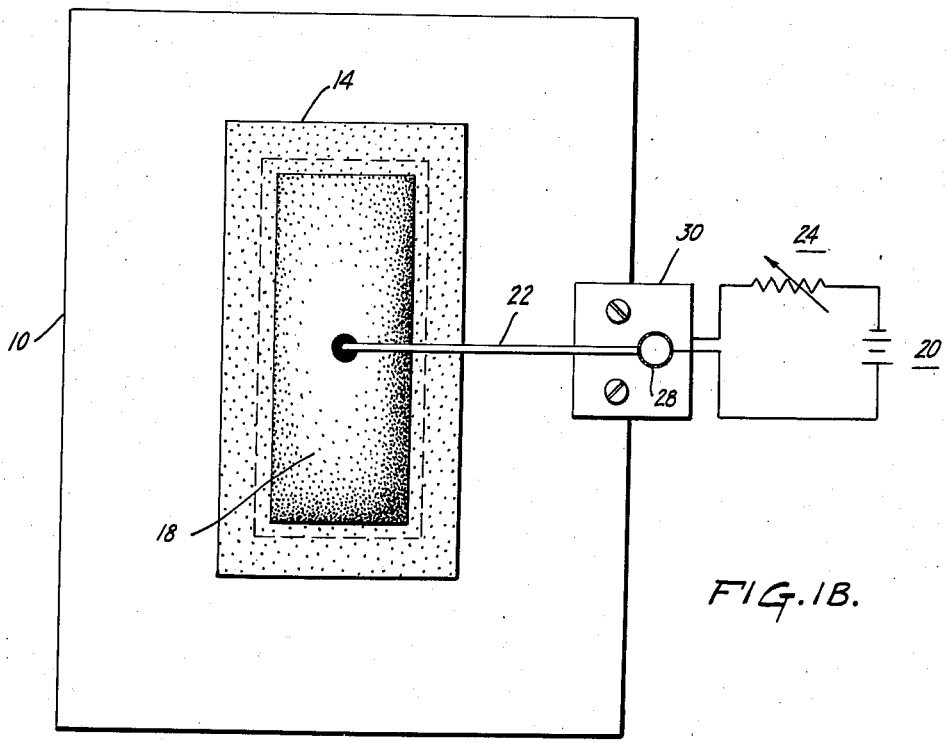

Referring now particularly to Figures 1A and 1B, wherein like numerals denote like parts, there is represented therein one simple form of embodiment of the invention from which a substantial cooling effect may be obtained. In this device there is provided a metal base plate 10 having a rectangular aperture 12 therein, and a thin wafer of semiconductive material 14 overlying aperture 12 and ohmically fastened to base plate 10, as by soldering around the periphery thereof. Formed within body 14, so as to confront a large portion of the aperture 12, is a P–N junction 16, which may be provided by alloying of a suitable impurity metal body 18 with the semiconductive material. Metal body 18 also serves as a metallic electrode to which external connection may readily be made, as by soldering.

For the present discussion it will be assumed that the semiconductive body 14 is predominantly N-type, and that a P-type region contiguous therewith provides a P–N junction 16 along the dotted line. A rectifying barrier is therefore established which is biased in the "forward" direction of relatively easier current flow when a potential positive with respect to the N-type portion of body 14 is applied to the P-type portion thereof, by way of metal body 18. During operation, such a forward bias is supplied by battery 20, the positive terminal of which is connected to metal body 18 by way of soldered lead wire 22, the negative terminal of the battery being connected to the base plate 10 by way of a current-controlling variable resistor 24. A suitable metal terminal post 26, ohmically soldered to base plate 10, facilitates connection of the base plate to the external circuit, and an appropriate insulated support for lead wire 22 is provided by another terminal post 28, which is electrically isolated from base plate 10 by an insulating wafer 30.

In operation, the structure is connected in circuit as shown, and current is thereby caused to pass through the junction 16 in the forward direction, into the semiconductive material 14. When the material is constituted, and the value of current utilized is selected, in accordance with the detailed teachings set forth hereinafter, passage of the current in the indicated direction results in the generation of a substantial cooling effect in the body 14. Although in this simplified form of the invention no additional means are indicated for transferring the cooling effect to a remote point, it will be appreciated that cooling of the surrounding environment will nevertheless be produced directly by the semiconductive body, as well as by the metal plate 10 which, because of its high thermal conductivity and relatively large area, serves in effect as a cooling fin.

Without intending to limit the scope of the invention, there will now be described one set of particular values for the several elements of the novel cooling device shown in Figures 1A and 1B, as well as one specific form of procedure for fabricating such a device.

In a specific embodiment employing the arrangement of apparatus shown in Figure 1, the semiconductive body 14 into which the minority-carriers are injected may comprise N-type germanium of single-crystalline form, containing antimony as the majority impurity and indium as the minority impurity, antimony atoms being present in a concentration of about $5 \times 10^{17}$ atoms per cc., or about 0.001 atomic percent, and indium being present in a concentration of about $5 \times 10^{16}$ atoms per cc., or about 0.0001 atomic percent. The resultant body has N-type conduction characteristics with a net resistivity of about 0.07 ohm-centimeters, the amount of indium being sufficient to produce, by itself, a resistivity of about 0.1 ohm-centimeters (P-type), and the amount of antimony being sufficient to produce, by itself, a resistivity of about 0.01 ohm-centimeters (N-type). To fabricate such material, pure germanium having a resistivity of at least 20 ohm-centimeters may be placed in a conventional furnace of the type customarily utilized for the growing of transistor germanium ingots by seed growth, and 0.60% antimony and 0.18% indium, by weight, may be added. Since the segregation constant for antimony is about 3 times that for indium, the amount of antimony added to the melt is only 3⅓ times the amount of indium added, although about 10 times as much antimony as indium will be contained in the final ingot. A single-crystalline ingot is then grown from the melt; the various techniques for this process are well known in the art and need not be described in detail herein. Suffice it to mention that an appropriate temperature to melt together the three above-mentioned ingredients is developed, by means of the furnace, in equipment which is free of undesired impurities, and in an atmosphere which has been carefully cleaned and may suitably consist of properly gettered and dried argon gas. The seed crystal, mounted upon an appropriate seed-rotating apparatus, is dipped into the melt and is then slowly lifted from the melt, while being rotated. Preferably the grown crystal is allowed to remain for a short period in a portion of the furnace provided with sufficient heat that the crystal, although still in solid form, permits of some migratory motion of the impurity atoms within the body, so as to facilitate the tendency toward pairing of impurity atoms contained therein. For example, I prefer to maintain the crystal at a temperature of 600° C. for about 20 minutes after pulling is completed. Following this, the crystal is cooled to room temperature at the rate of about 10° C. per minute.

At least portions of the germanium ingot thus obtained are characterized by a high radiative recombination rate and, when cut from the ingot, appropriately shaped and configured, and provided with the minority-carrier emitting elements and base connections, are suitable for use as basic cooling elements in accordance with the invention. Thus, to provide the complete cooling element, the antimony and indium-doped germanium ingot may be sawed transversely to the direction of its growth to produce wafers somewhat thicker than about 1/32 inch, and these wafers diced into blanks typically having dimensions of about 1/4" by 1" by 1/32". Blanks having the desired resistivity value of about 0.07 ohm-centimeter may then be selected by well-known measurement techniques. Preferably the selected blanks are then etched for a short period in a chemical etchant such as CP-4. A base plate of a metal such as nickel, and having the metal terminal post 26 soldered thereto, may be provided with a rectangular aperture or "window," having dimensions of about 3/16" by 15/16". One of the semiconductive blanks prepared as outlined above may be laid upon the nickel base plate so as to cover the aperture, and soldered to the base plate by a suitable N-type solder, so as to form an ohmic connection to the base plate; utilizing the dimensions mentioned above, the soldered region of overlap between semiconductor and metal plate is about 1/32". It will be understood that, where the solder employed for this purpose has a melting point less than that employed in the subsequent alloying procedure, such soldering is preferably postponed until after or during the alloying process.

Next, indium metal in the form of a rectangular strip about 3/32" by 13/16" may be laid over the blank and centered thereon, and then alloyed with the germanium to form a P-N junction within the blank and confronting the portion of the blank revealed by the rectangular aperture in the base plate. Conventional alloying techniques may be employed for this purpose; for example, suitable jigs or other holding devices may be utilized to confine the indium to the desired region during alloying, and the indium and the associated blank and base plate may be heated and then cooled to form a P-N junction situated about 1 to 10 mils from the opposite face of the semiconductive blank. A copper wire may then be soldered to the indium strip by quick-soldering with a low-melting-point solder. Appropriate circuit connections to the terminal 26 and to the wire 22 may then be provided as shown in Figures 1A and 1B. In some instances it may be desirable, before attaching the external leads and operating the device, to subject at least the semi-conductive body and the associated indium metal to a conventional clean-up etch.

Battery 20 may provide a potential difference of 1.5 volts, and the forward current through the P-N junction may be adjusted to about 0.2 ampere by variation of variable resistor 24. Under these conditions, the voltage applied between the terminals of the device of Figure 1 is about 0.1 volt, and a cooling effect of about 0.1 watt is produced at room temperature.

Although I do not wish to be limited by the details of any specific theory of operation of the apparatus of the invention, the following theoretical considerations will be helpful in understanding the operation of the invention and in applying it in various applications.

Thus, referring particularly to the several parts of Figure 2, in Figure 2A there are shown diagrammatically certain important operative elements of the basic cooling device of the invention. The principal element shown is a single-crystalline body 38 of semiconductive material such as germanium, corresponding to the body 14 of Figure 1A, having a P-type region 40 and an N-type region 41 separated by a transition region 42 in which the conductivity-type changes from P- to N-type; the latter transition region corresponds to the junction 16 in Figures 1A and 1B. Ohmic contacts 44 and 46, corresponding respectively to the metal 18 and the base plate 10 in Figure 1A, provide the connection to the external circuit comprising battery 48, variable resistor 50 and a switch 52 in series arrangement as shown. The N-type body portion 41 corresponds to the main portion of body 14 in Figure 1A from which radiations emanate, and body portion 40 represents the P-type region produced in body 14 by alloying of the impurity metal 18. Also shown in dotted line is an equivalent series resistor 54, which represents the ohmic resistance of body 38.

Figure 2B illustrates the detailed equilibrium conditions existing in the semiconductive device of Figure 2A during times when switch 52 is open so that no external potential difference is applied across the body. This diagram is a conventional electron-energy diagram, not necessarily to scale, in which horizontal positions correspond to positions in the semiconductive device of Figure 2A, while vertical positions correspond to electron energies; the lower solid line A represents the electron energy corresponding to the top of the valence band in the semiconductive body, while the upper solid line B represents the electron energy of the bottom of the conduction band thereof. The straight horizontal line C represents the position of the Fermi level in the semiconductive body and associated ohmic contacts.

As indicated by the diagram, the N-type body portion 41 contains a relatively large concentration of acceptor-impurity atoms such as 60, which have three valence electrons in their incomplete outer shell, i.e. one electron less than is necessary to satisfy the crystalline bonding structure of the semiconductive body; as an example, the indium atoms of the foregoing specific example are of this type. Such atoms exhibit a tendency to acquire and to bond electrons in the missing valence band and, due to the proximity of the energy levels of thus-bound electrons to the electron-energy corresponding to the top of the valence band, these impurity atoms tend to derive their wanted electrons from the valence band, thereby to produce so-called holes in the valence band. Although the immobile acceptor atoms tend to produce holes in the material, when ionized by acceptance of an extra electron they possess a net negative charge; for this reason they are designated in the figure by encircled negative signs, and tend to trap holes in their vicinities by electrostatic attraction.

While acceptor atoms are present in large concentrations in the region 41 to the right of transition 42, this region is predominantly N-type because of the presence therein of an even greater concentration of donor-impurity atoms, producing energy levels represented by the encircled positive signs such as 62. These atoms contain five valence electrons in their outer shell, one more than is necessary to complete the crystal lattice bond, and hence can easily release electrons for conduction, as indicated by the proximity of the energy-level of the donor atoms to the conduction band. A typical donor material is antimony, as mentioned in the foregoing specific example. As is well known, it is the excess of the concentration of one type of impurity over the concentration of the opposite type which determines the degree of conductivity and its nature, i.e. whether conduction is by holes or by electrons. Thus, due to the excess of the concentration of donor impurities over the concentration of acceptor impurities on the right side of transition 42, the majority-carriers available for conduction in region 41 are conduction-band electrons, as represented by the non-circled minus signs such as 64. The reasons for constituting the N-type body portion 41 in this manner, and further details of its preferred atomic structure, will be described hereinafter in more detail.

Assuming now that the P–N junction in the transition region 42 of Figure 2A has been formed by an alloy-type process, the body portion 40 to the left of transition 42 contains a concentration of donor atoms substantially equal to that in region 41, as indicated by the encircled positive signs such as 65, but a concentration of acceptor atoms 68 which has been so greatly augmented by alloying with an acceptor-type metal that it exceeds the concentrations of donor impurities and results in P-type conduction by excess holes in this region, as represented by the non-circled positive signs such as 70 in the valence-band region. Preferably the concentration of acceptor impurities 68 is sufficiently great that the resistivity of the P-type region 40 is much less than that of the N-type region 41, so that the junction formed is an efficient emitter of holes into the N-type material.

At the ends of the semiconductive body 38 adjacent the contacts 44 and 46, the valence and conduction bands, respectively, are shown merging with the Fermi level of the metal of the contact, representing a degeneracy of the semiconductor in this region such as to provide the desired ohmic connections.

In the transition region 42 between the P-type region 40 and the N-type region 41, the concentrations of donor and acceptor impurities change, abruptly but continuously, from the arrangement shown at the left in Figure 2B, to that shown therein at the right. As will appear from known theory, the requirement that the Fermi level of the material be the same in both the N- and P-type portions of the body at equilibrium results in the bottom of the conduction band B and the top of the valence band A in the N-type region 41 being situated substantially lower than in the P-type region 40, and in the creation, in the transition region, of a strong electric field constituting a rectifying barrier. In the equilibrium condition represented in Figure 2B, a substantial density of holes in the valence band extends from the P-type region, through the junction or transition region, and into the N-type body portion immediately adjacent the transition region, and, to a lesser extent, electrons in the conduction band similarly invade the P-type region; the potential barrier produced is such as to prevent the occurrence of high concentrations of electrons in the P-type material, and of holes in the N-type material, since electrons from the N-type region can surmount the barrier only by possessing unusually high energies, while holes can pass downwardly past the barrier only by possessing similar high energies.

The magnitude $\phi_{bo}$ of the resultant barrier is equal to the difference between the energy of the Fermi level of an isolated body of material like that of region 40, and that of an isolated body of material like that of region 41. Where the physical conditions are such that the Fermi level in the P-type material tends to be very near the valence band and the Fermi level in the N-type material tends to be very near the conduction band, the bottom of the conduction band B in the N-type region 41 is lowered nearly to the top of the valence band in the P-type material, and the barrier height $\phi_{bo}$ therefore approaches closely the value $\phi_G$ of the energy gap of the material, which for germanium is about 0.7 electron-volt. However, in general the barrier height will be less than the energy gap, by an amount substantially equal to the sum of the amount $\phi_P$ by which the Fermi level exceeds the top of the valence band in the P-type material and the amount $\phi_n$ by which the bottom of the conduction band exceeds the Fermi level in the N-type material; in the case of the specific material described hereinbefore, the amount $\phi_n + \phi_P$ by which the energy gap $\phi_G$ exceeds the barrier height $\phi_{bo}$ is about 0.15 e.v.

It will be understood that while the impurity atoms are substantially immobile, the locations of the charge carriers are not fixed, even in the equilibrium state shown in Figure 2B. Rather, due to thermal vibration of the crystal lattice, holes and electrons are continually being generated throughout the body 38. Some of the holes so generated in the P-type region reach the barrier with sufficient energy to traverse the barrier and pass into the N-type material, wherein they recombine quickly with electrons and are replaced by holes newly-generated in the P-type material. This hole current from P- to N-type material is exactly balanced by a flow of holes which are thermally generated within the N-type material, which diffuse to the region of the barrier, and which then slide across the barrier into the P-type material.

The net hole current is therefore zero at equilibrium, but it will be significant hereinafter that the hole current from the P-type material varies in the same sense as any non-equilibrium variations in barrier height which may be caused by applied voltages, while the hole current from the N-type material is substantially unaffected by variations in the barrier height.

At the same time, some of the free electrons thermally generated in the N-type material reach the barrier with sufficient energy to traverse it and to pass into the P-type material, wherein they recombine quickly with holes, and an equal counter-current of electrons flows from the N-type material to the P-type material. Corresponding to the case of the hole current, the electron current from the N-type material is barrier-height sensitive, while the electron current from the P-type material is not.

When switch 52 is closed to apply to the P-type region 40 a potential which is positive with respect to the N-type region 41, the conditions which obtain are represented in Figure 2C, in which figure representations of immobile impurity atoms have been omitted in the interest of clarity. An important characteristic of the resultant non-equilibrium condition is the shifting of the Fermi levels C'' and C' in the N- and P-type materials, respectively, and the diminution of the height of the barrier, by an amount equal to $q$ times the applied positive voltage $V_A$. This diminution permits lower-energy, and hence greater numbers of, holes to diffuse from the P-type material into the N-type material, and similarly permits a greater number of electrons to diffuse from the N-type material into the P-type material, without correspondingly increasing the oppositely-directed hole and electron currents. A net current flow across the barrier therefore occurs and, since the currents affected are exponential functions of barrier height, the current flow increases rapidly with applied potential. This relatively large net flow of carriers across the barrier into regions in which they are in the minority is designated herein as forward current flow, and the applied voltage across the barrier is designated the forward bias of the barrier. In a preferred embodiment the equilibrium concentration of holes in the P-type region is much greater than that of electrons in the N-type region, and the forward current across the barrier is therefore accomplished primarily by hole conduction. However, it will be understood that, although the currents across the barrier are transported by carriers of the type indicated, because these carriers recombine with opposite types of carriers soon after injection into the material of opposite conductivity-type, the current in the body 38 at ohmic contact 44 is composed substantially entirely of holes, and that at contact 46 of electrons.

The nature and causes of the cooling effect obtained in accordance with the invention will now be described, with the aid of the diagram of Figure 2C. Consider for example an electron initially in the valence band in the N-type portion 41 of the body 38 immediately adjacent the transition region 42, as exemplified at $m$. As is the case with all electrons in the valence band, such an electron is subjected to thermal agitation produced by heat variations of the crystal lattice, commonly described in terms of "phonons." This designation is employed by analogy to the term photon, because the thermal vibrations of the lattice are quantized as to permissible energy levels, and interchange energy with electrons somewhat as if their energy were localized in particle form.

When, in accordance with the laws of probability, such an electron in the valence band receives an amount of energy from thermal lattice vibrations, or phonons, which is just sufficient to permit it to pass over the voltage-reduced barrier into the valence band of the P-type region, such a transfer may take place. Transfer of this electron from the valence band of the N-type material to that of the P-type material creates a hole in the N-type material, and such an electron transfer therefore constitutes the injection of a hole into the N-type material. Since the electron thus transferred is one which did not have sufficient energy to traverse the barrier until the barrier was reduced by an amount equal to $q$ times the applied potential $V_A$, and since the flow of electrons across the barrier from the P-type material is not increased by the applied voltage, the resultant injected hole is in excess of the equilibrium concentration of holes in the N-type region 41. Accordingly, to preserve neutrality in body 41, an electron enters the N-type region from contact 46 substantially simultaneously with the injection of the hole therein; similarly, an electron simultaneously leaves body 40 by way of contact 44.

It will therefore be apparent that lowering of the equilibrium barrier height $\phi_{bo}$ by an amount $V_A q$ to a new value $\phi_{bv}$ has resulted in the production, in the N-type region 41, of a valence-band hole and a conduction-band electron which otherwise would not exist. It is important that the energy of this hole-electron pair is $\phi_g$, while the energy absorbed from the external power source in producing the pair is only $V_A q$ where $q$ is the value of the electron charge. The balance $(\phi_g - V_A q)$ of the hole-electron pair energy is derived from phonon energy, i.e. thermal energy of the crystal lattice, and represents a basic cooling effect exerted upon the lattice by the creation of the excess hole-electron pair through the agency of the applied potential, which is utilized in accordance with the invention to obtain refrigeration. To ensure that this cooling effect is obtained, $V_A q$ should be less than $\phi_g$, a condition which is met as long as the value of $V_A$ in volts is less than the value of $\phi_g$ in electron-volts.

It is noted that the absorption of the energy $\phi_g$ by electrons transferred from the valence band in region 41 to the valence band in region 40 occurs primarily at the P–N junction, where amounts of energy $\phi_{bv}$ are absorbed in surmounting the barrier; the remainder is absorbed in the amounts $\phi_p$ and $\phi_n$ as electrons leave body 38 by way of contact 44 and enter body 38 by way of contact 46, respectively, both of which transfers involve increases in the energy of electrons. The energy absorbed upon the injection of an excess hole into the N-type region 41 from P-type region 40 is therefore indicated by the expression:

$$\phi_n + \phi_p + \phi_{bv} + V_A q$$

which, as will be apparent from Figure 2C and the foregoing, equals $\phi_g$. Of the four types of absorption represented in this expression, the first three derive their energy at the expense of thermal energy of the lattice, and of them $\phi_{bv}$ is ordinarily by far the greatest. Accordingly, while a basic cooling effect per transferred electron of approximately $\phi_g - V_A q$ is inherently available in my device, where $\phi_p$ and $\phi_n$ are both small the basic cooling effect per electron is, to a close approximation, equal to $\phi_{bv}$, and when considering the cooling action at the P–N junction it represents the entire cooling effect available.

The total basic cooling effect, expressed in terms of cooling power, which is produced by a net current $I_h$ of holes flowing through the device of Fig. 2A then equals $(\phi_g - V_A q)$ multiplied by the net number of carriers flowing across the barrier per second, or $$\frac{I_h}{q}(\phi_g - V_A q)$$

which in turn equals:

$$I_h\left(\frac{\phi_g}{q} - V_A\right) \quad (1)$$

The foregoing explanation of the basic cooling effect obtained by forward-biasing of a device according to the invention has described only the effects of the hole-current component of non-equilibrium current flow, since it has been assumed that the barrier is of a type in which hole current predominates. When the P-type material contains an excess of acceptor impurities in the vicinity of the transition region which is much greater than the excess of donor impurities in the N-type material adjacent the transition region, the hole current is in fact much greater than the electron current, e.g. 100 times greater, and as a practical matter only the hole current flow need then be considered. Such is the case when the amount of acceptor-type metal alloyed with the semiconductive body is sufficiently great; it is usually also the case when a minority-carrier emitting surface-barrier contact is used to produce the rectifying barrier in the N-type material. In such cases the hole current $I_h$ is substantially equal to the total current I, and Expression 1 above may be written as:

$$I\left(\frac{\phi_g}{q} - V_A\right) \quad (2)$$

In other cases in which the electron component of non-equilibrium current flow is a substantial fraction of the total current, an analogous cooling effect occurs by a similar mechanism due to electron injection, and the total basic cooling effect is still given by Expression 2.

The basic cooling effect described hereinbefore represents a maximum rate of cooling which is approached when, further pursuant to my invention, the body of semiconductive material into which minority-carriers are injected by the externally-applied voltage is characterized by a high-radiative recombination rate. If, instead, a semiconductive material of the type commonly used in semiconductive devices is utilized in the N-type region 41 shown in Figure 2A, the basic cooling effect described hereinbefore is substantially completely cancelled by a reconversion into phonons of the energy originally absorbed from the lattice by the electrons. This reconversion occurs within the semiconductive body, in the process of ordinary hole-electron recombinations, substantially as follows. Each excess hole created in the N-type region by the forward-biasing of the P–N junction in Figure 2A recombines soon after injection with one of the many electrons in that region, which, with reference to Figure 2C, means that an electron in the conduction band falls back across the forbidden band into the valence band, thereby losing energy $\phi_g$. In recombinations of the type occurring in usual semiconductive materials, the energy $\phi_g$ is converted substantially completely into thermal energy of the lattice, a type of recombination which is designated herein as phonon recombination. In such recombinations energy is given up in very small steps with the production of quantum wavelengths which are so long as to be absorbed completely by the semiconductive material. Substantially all of the recombinations ordinarily occurring in germanium and silicon at room temperature are of this type. The basic cooling effect $(\phi_g - V_A q)$ obtained by the injection of a hole into the N-type material is overcome in such cases by the heating effect of the subsequent phonon recombination, even when the applied voltage is so small that $V_A q$ and any ohmic heating effects are also very small. With any substantial applied voltage, instead of net cooling, a net heating effect is actually obtained which is substantially equal to $$V_A q + I^2 R_{eq}$$

where $R_{eq}$ is the ohmic resistance of body 38 as represented by resistor 54 in Figure 2A.

However, there is another type of hole-electron recombination which can occur, in which holes and electrons recombine by a process in which the electrons fall across at least a substantial part of the energy gap in a single instantaneous step. The quantum frequencies of electromagnetic radiations corresponding to these energy changes of the electron are sufficiently high that they can pass through semiconductive materials, and the energy of the hole-electron pair is therefore converted in such a recombination to energy which can radiate to the exterior of the crystal.

One example of such radiative recombination occurs when an electron in the conduction band recombines directly with a hole in the valence band; in this case, the electron falls across the energy gap, and substantially all of the energy $\phi_g$ may be converted into radiated energy. To the extent that the radiations thus produced escape from the crystal, the energy returned to the lattice by recombination fails to cancel completely the basic cooling effect. The escaping radiative energy due to direct recombinations of excess hole-electron pairs therefore equals the net cooling effect produced by injection of minority carriers into the material of high radiative recombination rate. Designating the percentage of the energy of excess hole-electron pairs which is radiated from the crystal as $\alpha$, the energy radiated from the device of Figure 2A in response to a forward current I may be expressed as $$\alpha \frac{\phi_g}{q} I$$

Stating the foregoing in mathematical form, the basic cooling effect $$I\left(\frac{\phi_g}{q} - V_A\right)$$

is counteracted because of recombinations by an amount $$(1-\alpha)\frac{I}{q}\phi_g$$

giving a net cooling effect equal to $$I\alpha\frac{\phi_g}{q} - IV_A$$

which is further reduced by an amount of ohmic heating equal to $I^2 R_{eq}$, so that the total cooling effect is given by the expression:

$$I\alpha\frac{\phi_g}{q} - IV_A - I^2 R_{eq} \quad (3)$$

It is noted that the first term of the latter expression represents the radiated energy, the second term the electrical work done to produce the radiation, and the latter term the ohmic heating of the semiconductor. The total resultant cooling effect is therefore equal to the rate of escape of radiant energy, less the work done in passing the current I through the device. So long as $\alpha$ is greater than $q/\phi_g(IR_{eq} + V_A)$, the total effect is one of cooling. From the latter expression it may be seen that when I and $V_A$ are very small, a relatively small value of $\alpha$ is sufficient to produce a cooling effect, but the amount of cooling effect is then also very small. As I and $V_A$ are increased, the cooling effect also increases at first, but at a relatively large current, $I_{max}$, the electrical work done and the ohmic losses overcome the cooling effect and heating results even for large values of $\alpha$. The cooling efficiency of the device is therefore maximum near zero current, but the greatest rate of useful cooling occurs between zero and $I_{max}$. The value of current I producing maximum cooling may readily be determined experimentally for any particular form of embodiment, but it may also be readily calculated from Expression 3 above by differentiating the expression with respect to I, setting this derivative equal to zero, and solving the resultant expression analytically or graphically for I in terms of the values of the physical parameters of the particular embodiment.

In the immediately preceding discussion, it has been assumed that the basic cooling effect is approximately equal to $I(\phi_g/q - V_A)$, as set forth in Equation 2. As pointed out hereinbefore, when the equilibrium barrier height $\phi_{bo}$ is substantially less than the energy gap $\phi_g$, as may occur with some materials, then the net cooling effect $$\frac{I}{q}\phi_{bv}$$

produced at the barrier may be substantially less than $I(\phi_g/q - V_A)$, and the net cooling effect, exclusive of ohmic losses, due only to absorption of energy at the P–N junction is then more accurately given by the expression $$I\left(\frac{\phi_g}{q} - V_A\right) - I\left(\frac{\phi_n}{q} - \frac{\phi_p}{q}\right)$$

which differs from Expression 2 by the last term in which the cooling effects of the ohmic contacts are subtracted. However, since the cooling effect $$I\left(\frac{\phi_n}{q} - \frac{\phi_p}{q}\right)$$

of the contacts also contributes to the total cooling effect, the cooling produced by the complete device is properly expressed by Equation 2.

It will also be understood that minority-carrier injection into P-type material may be utilized as the principal current component producing cooling, in which event the minority-carrier is the electron and the portion of the body of high radiative-recombination-rate may suitably comprise heavily-compensated P-type material. In this case, the basic operation is similar to that described hereinbefore in connection with minority-carrier emission into N-type material, with the exception that it is electrons in the conduction band passing over the barrier and into the conduction band in the P-type material, which produce most of the cooling effect.

In view of the foregoing it will be appreciated that by making $\alpha$ large and $R_{eq}$ small the total cooling effect obtained at any current is enhanced. Materials having such desired values of $\alpha$ and $R_{eq}$, and methods for their fabrication, are described hereinafter in detail. In general, $R_{eq}$ may be made low by using low resistivity semiconductive material and by forming it into a body of large cross-section. In order to make the factor $\alpha$ large, the radiative recombination rate of the material should be large, and provision should be made to permit radiations so produced to escape to the exterior and to a region thermally insulated from the semiconductive body.

Considering now in order the several factors affecting the value of $\alpha$ obtained, I have found that radiative recombination rates of a magnitude suitable for refrigeration in accordance with the invention may be produced by utilizing a semiconductive material containing large concentrations of both the majority-carrier impurity and the minority-carrier impurity, so that large numbers of both types of impurities are intimately intermingled within the portion of the semiconductive body near the transition region into which minority-carriers are injected; and that the radiative recombination rate may be further enhanced by causing the majority- and minority-carrier producing impurity atoms to occur in pairs in which a donor atom and an acceptor atom are closely spaced from each other, although not immediately adjacent neighbors in the crystal. Both of these characteristics of the material contribute to increasing the probability of radiative hole-electron recombination, the first by increasing the number of opportunities for such recombinations and the second by increasing the probability that any given pair of donor and acceptor atoms will cause such a recombination. More particularly, the donor impurity atoms, having given up electrons from their valence structure, are left with net positive charges which tend to trap or immobilize electrons in the adjacent regions of the crystal. Acceptor impurity atoms, on the other hand, which lack electrons to complete their valence bond structures, tend to accept additional electrons, thereby becoming negatively charged so as to trap or partially immobilize holes in their vicinities. Such adjacent, immobilized electrons and holes have excellent probabilities of recombining directly with the production of radiative energy. However, if donor and acceptor impurities are immediately adjacent neighbors in the crystal, there is a high probability that they will form a bond with each other through the mutual sharing of the extra electron of the donor impurity with the unsatisfied valence bond of the acceptor impurity, resulting in a neutralization of local charge and the elimination of any substantial trapping effects; where there is at least one intervening atom between the donor and acceptor impurities, such sharing becomes relatively unlikely, and trapping by each type impurity is both possible and probable.

In the material of this type which I prefer to use to achieve high radiative recombination rates by pairing of donor and acceptor atoms in a semiconductive crystal, the donor and acceptor atoms produce distortions of similar sense of the crystal lattice. For example, in the case of the antimony and indium impurities in germanium, which I employ in one preferred embodiment, both atoms are larger than the germanium atom and hence produce local dilatations of the crystal lattice. Because of their similar effects upon the lattice, a donor atom and an acceptor atom cannot readily assume immediately adjacent positions in the germanium during crystallization of the germanium; thus a type of repulsion exists between such atoms when they approach each other very closely during, or immediately prior to, crystallization. This repulsion varies approximately in inverse proportion to the fourth power of the separation between donor and acceptor atom, and tends to overcome the inverse-square-law coulombic attraction between the atoms when the separation becomes small. Accordingly, immediately prior to crystallization or during annealing, the donor and acceptor atoms tend to approach each other closely because of their opposite charges, but they are prevented from becoming nearest neighbors by the mutually repulsive effects of their crystal distortions. As a result the impurity atoms locate themselves in the paired positions described hereinbefore in which the probability of radiative recombinations is very high.

The necessary high densities of impurities may be obtained by crystal growth from a heavily-doped melt, or by alloying or diffusion processes, as mentioned hereinbefore in connection with germanium. When utilizing silicon as the semiconductor, a suitable material may be provided by inserting one end of a strongly N-type, single-crystalline silicon ingot into a melt of indium at about 1200° C., holding the ingot in the melt until enough silicon has been dissolved to saturate the melt, and then cooling the melt to about 800° C. to recrystallize a strongly P-type layer of indium-doped silicon upon the end of the ingot. A portion of the ingot near the end and containing both the P-type layer and some of the N-type layer may then be sliced off, and, after application of appropriate ohmic contacts, utilized to produce a cooling effect by passage of current through it in the forward direction.

In the case of semiconductive materials utilizing paired impurities to produce recombinations across substantially the entire energy gap, the impurities will usually consist of donor metal atoms and acceptor metal atoms in large concentrations and mutually interspersed. In the case of germanium, pairs of elements other than indium and antimony which may be used are gallium and antimony, gallium and arsenic, aluminum and antimony; in the case of silicon, indium and antimony, phosphorous and aluminum, or boron and phosphorous are examples of elements which may be used as acceptor and donor impurities, respectively. It will be understood that the donor material may comprise a mixture of donor elements, and the acceptor material may comprise a mixture of acceptor elements.

Although doping of semiconductive materials with donor impurities providing electron levels just below the conduction band, and with acceptor impurities providing electron energy levels just above the valence band, in the manner described hereinbefore, constitutes one satisfactory procedure for producing materials of high radiative recombination rates, other types of materials having high radiative recombination rates may also be employed advantageously in some embodiments. The types of materials specifically described hereinbefore are characterized in that recombinations occur across the entire energy gap, producing maximum radiation at frequencies near a value of $\phi_g/h$, where $h$ is Planck's constant. For germanium the radiation peak is about 1.8 microns. Since the absorption spectrum of the semiconductive body produces substantial attenuation at these frequencies, an appreciable part of the energy to be radiated may be absorbed by the body if the path length in the body is long. For this reason it is preferred in such embodiments to utilize a semiconductive body so shaped that most of the radiative recombinations occur near a surface of the body, as in the arrangement of Figure 1.

However, by utilizing other types of semiconductive material in which the radiations produced by recombinations are principally at frequencies for which body absorption is relatively small, this problem may be minimized. One such type of material to be described hereinafter in detail, which may be employed for this purpose, produces recombinations in which electron-energy transitions across the energy gap occur in a plurality of stages or steps, and the resultant radiations include a large proportion of energy at frequencies for which the body absorption is relatively small.

With regard to materials having high radiative recombination rates and producing radiations by multiple transitions across the energy-gap of the semiconductor, such materials may take the form of a principal semiconductive constituent such as germanium heavily doped with a multilevel acceptor impurity such as zinc, gold, silver, nickel, iron or cobalt, for example, which produce more than one permissible electron-energy state within the forbidden band of the semiconductive material. In such a material, radiative recombinations by transitions between different levels in the forbidden band occur with a high degree of probability and with efficient emission of radiative energy.

While enhancement of radiative recombination in semiconductive bodies may be obtained by utilizing large concentrations of impurity substances in the manner described hereinbefore, efficient conversion of hole-electron pairs into radiation does not necessarily require impure crystals. There also exists a class of luminescent materials known as edge emitters which perform such energy conversion with great rapidity and high efficiency. In such materials the recombination of a hole and an electron corresponds to an "allowed transition," so that such materials exhibit a short lifetime for minority carriers. Since minority carriers readily recombine directly with majority carriers in such materials, competing recombination processes are at a disadvantage and a very large proportion of pairs recombine to produce radiation, instead of thermal agitation of the crystal. Intermetallic compounds formed from an element of column III of the periodic table and an element from column V exhibit such edge emission to a marked degree, so that these compounds are well adapted to the method of electronic cooling set forth in this specification. In particular, indium antimonide has been found to radiate with efficiency in excess of 80% at a wavelength of approximately 7 microns, which wavelength corresponds to the energy difference between the top of the valence band and the bottom of the conduction band of that particular crystal. Gallium antimonide is also a very suitable material exhibiting radiation of slightly higher quantum energy corresponding to its wider energy band gap. Edge emission has been observed in gallium phosphide, although the wavelength of this radiation is shorter than optimum for refrigeration purposes. One way in which materials exhibiting edge emission can be identified is to examine the absorption of infrared radiation by materials under test. What is sought is a material which is as transparent as possible for long infrared radiation up to a particular frequency called the absorption edge, and which is as opaque as possible for frequencies higher than this absorption edge, the transition from transparency to opacity being as abrupt as possible. Such an absorption characteristic is indicative of easy conversion of radiation into hole-electron pairs and vice versa.

For purposes of the present invention it is also important that the material be a semiconductor of low resistance, and preferably a semiconductor from which an N-P junction can be conveniently prepared, or, alternatively, admitting of carrier injection from surface-barrier electrodes. In the case of a compound between a column III metal and a column V metal, N-type material may be obtained by doping with tellurium and P-type material may be obtained by doping with cadmium. Intermetallic compounds formed from column II and VI elements such as cadmium telluride, may also be used to produce substantial radiative recombinations, in which case, as an example, N-type regions may be produced by doping with indium, and P-type regions may be obtained by doping with copper.

Turning now to arrangements for enhancing the value of $\alpha$ of Expression 3 above by shaping of the body of material of high radiative recombination rate, in general the shape employed should be such as to minimize the path length of radiations in the material. As represented in Figure 1, this may be accomplished by locating the region in which excess electron-hole pairs are created so as to lie immediately adjacent a surface of the body. Under these conditions the path length in the material of escaping radiation may readily be made very short, e.g. less than 1 mil. In some cases the possibilities of multiple internal reflections of radiations reaching the body surface at angles differing from 90° by more than the critical angle $\beta$ are advantageously minimized by employing opposite body surfaces making an angle with each other which is greater than zero but less than $\beta/2$, a typical value being about 5°. With such non-parallel surfaces, multiply-reflected radiations initially incident upon interior surfaces at greater than the critical angle tend to approach normal incidence and to escape after a few reflections. The body of semiconductive material may also be formed in the shape of a portion of a Weierstrass sphere, with the minority-carrier injecting means arranged ot lie near a point displaced from the center of the sphere by a distance substantially equal to $R/\mu$, where $R$ is the radius of the sphere and $\mu$ is the index refraction of the body.

As mentioned hereinbefore, the cooling effect obtained is enhanced by using a structure in which the equilibrium barrier height $\phi_{bo}$ is large. $\phi_{bo}$ in turn is large when a large discontinuity in the chemical potentials of the materials is provided in the transition region in which the barrier occurs. In the case of a P-N junction, the barrier height is ordinarily approximately equal to the magnitude of the forbidden-band energy gap, less the sum of the difference in the N-type material between the Fermi level and the bottom of the conduction band and the difference in the P-type material between the top of the valence band and the Fermi level. The equilibrium barrier height is therefore increased by using N- or P-type materials for which the Fermi level is close to the corresponding edge of the forbidden band, as by using large excess concentrations of impurities providing activator energy levels near the extremes of the forbidden band. Furthermore, if only the material on one side of the barrier is characterized by a high radiative recombination rate, then the transition region of material should be a good emitter of minority-carriers into that material. For example, when a P-N junction is employed and only the P-type material adjacent the junction is of high radiative recombination rate, then the P-type region preferably contains a much higher excess concentration of acceptor impurities than the N-type material does of donor impurities; and if a surface-barrier contact is used to provide the desired potential barrier, then that contact should be fabricated to possess the characteristics of a good emitter of minority-carriers into the semiconductive material. In this manner it is ensured that a large percentage of the total current traversing the barrier is exposed to a high probability of radiative recombinations.

There will now be described one embodiment of the invention in which basic cooling elements of the general type described with particular reference to Figs. 1A and 1B are combined to provide refrigeration of an enclosed chamber. Referring to Figure 3A, a thermally insulated box 81, provided with a hinged and appropriately-sealed door 82, is cooled by a set of cooling coils 83 disposed along the upper interior surface of box 81 which, in turn, are supplied with cooled fluid 84 from cooling unit 86.

Cooling unit 86 comprises a container 87 having all sides except the upper one heat-insulated from the environment by conventional means, and through which container the fluid 84 circulates by way of openings 88 and 89, partly by convection and in this case partly in response to operation of a fluid-circulating pump 90. Contained within the cooling unit 86 and immersed in the refrigerating fluid 84 is a group of cooling units of the type shown in Figure 1, and using a common base plate 92. Thus, as is shown more clearly in Figure 3B, a single metal plate 92 is provided with a two-dimensional array of rectangular openings such as 93, each corresponding to the opening 12 of Figure 1 and each being overlaid with an N-type semiconductive cooling body, such as 96, of the type described in connection with Figure 1. Electric current is supplied to the semiconductive bodies in parallel, by way of a pair of busbars 98 and 100 and connecting wires such as 102. Electric current passing from busbar 100 to busbar 98 by way of the plurality of semiconductive cooling elements then produces a cooling effect in the semiconductive bodies which is transmitted to the fluid 84 and serves to cool the interior of box 81.

To facilitate escape to the exterior of radiations produced by electron-hole recombinations in the several semiconductive bodies, the top of cooling unit 86 is closed by a cover 104 of a material which exhibits substantial translucency for such radiations; for most purposes a thin quartz plate is adequate. Similarly, the fluid 84 should be translucent to the radiations, and should create a layer of fluid above plate 92 no thicker than is necessary for proper thermal contact therewith. A suitable fluid for this purpose is carbon tetrachloride.

Operating power at low voltage and high current may be supplied to busbars 98 and 100 from a power-supply 110, which in turn is supplied at its input terminals with power from a 60-cycle power line represented by generator 111. Suitably the power supply may comprise a voltage step-down transformer and appropriate current-rectifying means for converting the higher-voltage A.C. line power to lower-voltage D.C. power for supply to cooling unit 86. In the specific arrangement shown, the alternating current is supplied to the power supply 110 by way of a manually-operable, on-off switch 112 and a thermostat-operated switch 114, the latter switch being normally closed by spring-tension and opened only when the temperature in box 81 falls below the desired refrigerator temperature. A bellows-type thermostat 118 responsive to the temperature inside box 81 is provided to control the opening and closing of switch 114, in conventional manner. If desired, optional pump 90 may also be controlled by thermostat 118, and thereby turned on automatically at the same time as the supply current for the cooling unit.

The resultant structure operates automatically to maintain the temperature in box 81 within the desired range below the temperature of the surrounding environment, concommitantly radiating electromagnetic radiations by way of the cover 104; typically these radiations are in the infrared region. The cooling effect of the cooling unit is approximately equal to the number of cooling elements multiplied by the cooling effect of each, where each element may readily produce a cooling effect of about 0.1 watt, as indicated hereinbefore. In one form of the refrigerator, the aggregate of cooling elements may comprise eight rows of twenty elements each, for a total of 160 elements. Such an aggregate may readily be arranged upon a common base plate 92 which is one foot wide and 1½ feet long, to provide a useful cooling effect of at least 16 watts to box 81 while supplied with a current of about 32 amperes at 0.1 volt, for an input power of about 3.2 watts.

While for simplicity the arrangements shown in the figures thus far described utilize a direct-current supply to actuate the cooling elements, I have found that since the emitter devices themselves are rectifiers of current, an alternating-current supply may be utilized, and, to make best use of the supply current in this case, aggregates of elemental cooling devices may be arranged so that some of them operate upon one half cycle of the applied alternating current and the others upon the opposite half cycle. One such arrangement is shown, for example, in Figure 4, in which an alternating current source 120, such as a 60 cycle A.-C. line, is connected in opposite polarities to a pair of similar P-N junction cooling devices 122 and 124. During half-cycles of the applied current of one polarity, the base plate 126 of device 122 is biased in the forward direction with respect to contact 128 thereof, and minority-carriers are emitted into the N-type portion with resultant cooling; during the half-cycles of the opposite polarity, the device 124 is biased in the forward direction, and a cooling effect is produced by this device. It will be understood that aggregates of such pairs may be utilized in arrangements such as that shown in Figure 3 to provide large cooling effects with an alternating-current supply.

Although the invention has been described with particular reference to specific embodiments thereof, it will be understood that it is susceptible of embodiment in many other forms, such as will appear to one skilled in the art in view of the foregoing teachings, without departing from the scope of the invention.

I claim:

1. In the art of refrigeration, the method which comprises cooling a heat load by maintaining said heat load in intimate heat-exchange relation with a semiconductive element containing a minority-carrier emissive potential barrier and also containing a region of radiative-recombination material adjacent said barrier, and passing a current across said barrier in the forward direction to inject minority-carriers into said region thereby to produce characteristic electromagnetic radiation from said body, said current having a value lying in a range between a lower limit greater than zero and an upper limit for which the heating effect of said current due to the resistance of said body becomes as great as the cooling effect exerted by said current.

2. A method in accordance with claim 1 in which said current is passed across said barrier by applying an alternating voltage across said barrier.

3. A method in accordance with claim 1 comprising also the step of absorbing said radiation in a region thermally insulated from said body.

4. A cooling device comprising a body of semiconductive material having a potential barrier therein and a first region of substantial radiative recombination rate adjacent said barrier, means for applying a voltage $V_A$ between a second and a third region of said body separated from each other by said barrier to pass a curent $I$ across said barrier in the forward direction and to inject minority-carriers into said first region, thereby to produce radiative recombinations of majority and minority carriers in said first region, said recombinations inherently producing characteristic electromagnetic radiations of energy from said body at a rate which increases with said curent at less than a square-law rate, said voltage being sufficiently small that said rate of radiation of energy exceeds the sum of the rate of electrical work $IV_A$ done to produce the radiations plus the rate of generation of heat $I^2R_{eq}$ produced in said body by the flow of said current through the ohmic resistance $R_{eq}$ between said first and second regions.

5. A refrigeration system comprising a heat load to be cooled, a semiconductive body having a minority-carrier emissive potential barrier therein and a first region of substantial radiative recombination rate adjacent said barrier, means for applying a forward-biasing voltage $V_A$ between a second region of said body and a third region thereof separated from said second region by said potential barrier thereby to produce a current $I$ across said barrier and to inject minority-carriers into said first region, said minority-carriers inherently producing radiative recombinations in said first region and characteristics electromagnetic radiations of energy from said region at a rate which increases with said current at less than a square-law rate, said voltage $V_A$ being sufficiently small that said rate of radiation of energy exceeds the sum of the rate of electrical work $IV_A$ done in producing said radiations plus the rate of generation of heat $I^2R_{eq}$ produced in said body by the flow of said curent $I$ through the ohmic resistance $R_{eq}$ between said first and second regions, means providing heat-exchange between said body and said heat load, and means disposed adjacent said body and providing a substantially transparent path for said radiations from said body to a region thermally insulated from said body.

6. The system of claim 5, comprising also temperature-sensitive means responsive to decreases in the temperature of said load to reduce said rate of radiation.

7. The system of claim 5, comprising also current-controlling means connected with said temperature-sensitive means for reducing said current when said temperature falls below a first value and for increasing said current when said temperature rises above a second value greater than said first value.

8. The system of claim 5 comprising also means for thermally insulating said heat load from its surrounding environment.

References Cited in the file of this patent
UNITED STATES PATENTS

| | | |
|---|---|---|
| 2,685,608 | Justi | Aug. 3, 1954 |
| 2,729,949 | Lindenblad | Jan. 10, 1956 |
| 2,749,716 | Lindenblad | June 12, 1956 |
| 2,758,146 | Lindenblad | Aug. 7, 1956 |
| 2,759,861 | Collins et al. | Aug. 21, 1956 |

OTHER REFERENCES

Kaltetechnik, vol. 5, No. 6, June 1953, page 155.

Ridenour, L. N.: Modern Physics for the Engineer, McGraw-Hill, New York, 1954, page 401.

Haynes, J. R. and Briggs, H. B.: "Radiation Produced in Germanium and Silicon by Electron-Hole Recombination," Physical Review, vol. 86, April–June 1952, page 647 (QC1P4).

Haynes, J. R.: "New Radiation Resulting From Recombination of Holes and Electrons in Germanium," Physical Review, vol. 98, April–June 1955, pages 1806–1868 (QC1P4).

Haynes, J. R., and Westphal, W. C.: "Radiation Resulting From Recombination of Holes and Electrons in Silicon," Physical Review, vol. 101, No. 6, Mar. 15, 1956, pages 1676–1678.

UNITED STATES PATENT OFFICE
CERTIFICATION OF CORRECTION

Patent No. 2,898,743                              August 11, 1959

William E. Bradley

It is hereby certified that error appears in the above numbered patent requiring correction and that the said Letters Patent should read as corrected below.

In the heading of the printed specification, and in the heading to the drawings, Sheets 1, 2, and 3, title of invention, for "ELECTRONIC COOLING DEVICE AND METHOD FOR THE FABRICATION THEREOF", each occurrence, read --ELECTRONIC COOLING DEVICE AND METHOD --; column 4, line 29, for "potental" read -- potential --; column 6, line 24, for "CP-4" read -- a mixture of nitric acid, hydrofluoric acid and bromine --; column 14, line 26, for "recombniation" read -- recombination --; column 16, line 31, before "VI" insert -- column --; line 60, for "ot" read -- to --; column 19, line 16, for "curent" read -- current --; lines 33 and 34, for "characteristics" read -- characteristic --; line 40, for "curènt" read -- current --; column 20, line 8, for the claim reference numeral "5" read -- 6 --.

Signed and sealed this 18th day of April 1961.

(SEAL)
Attest:
ERNEST W. SWIDER
Attesting Officer

DAVID L. LADD
Commissioner of Patents